Patented Nov. 3, 1936

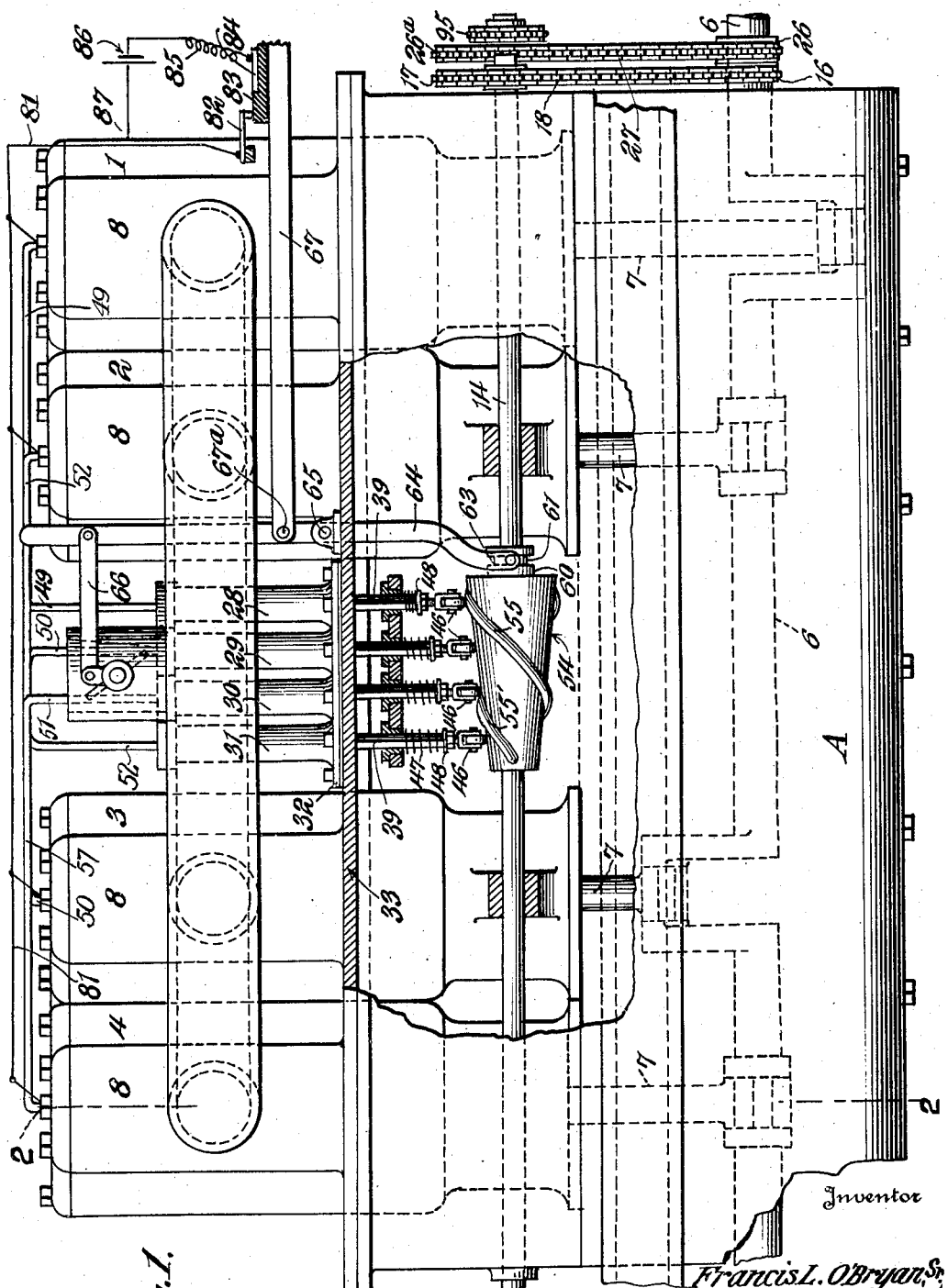

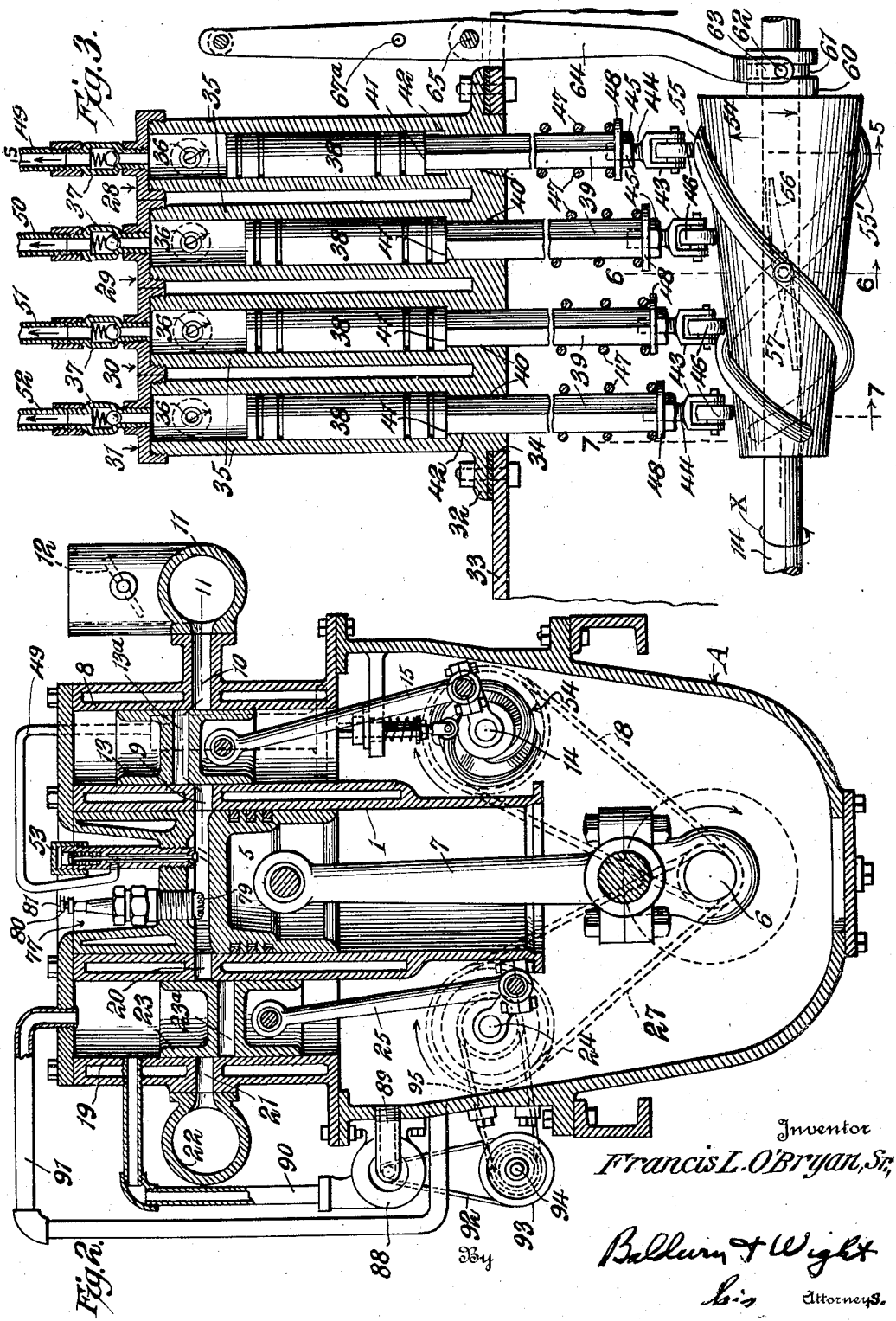

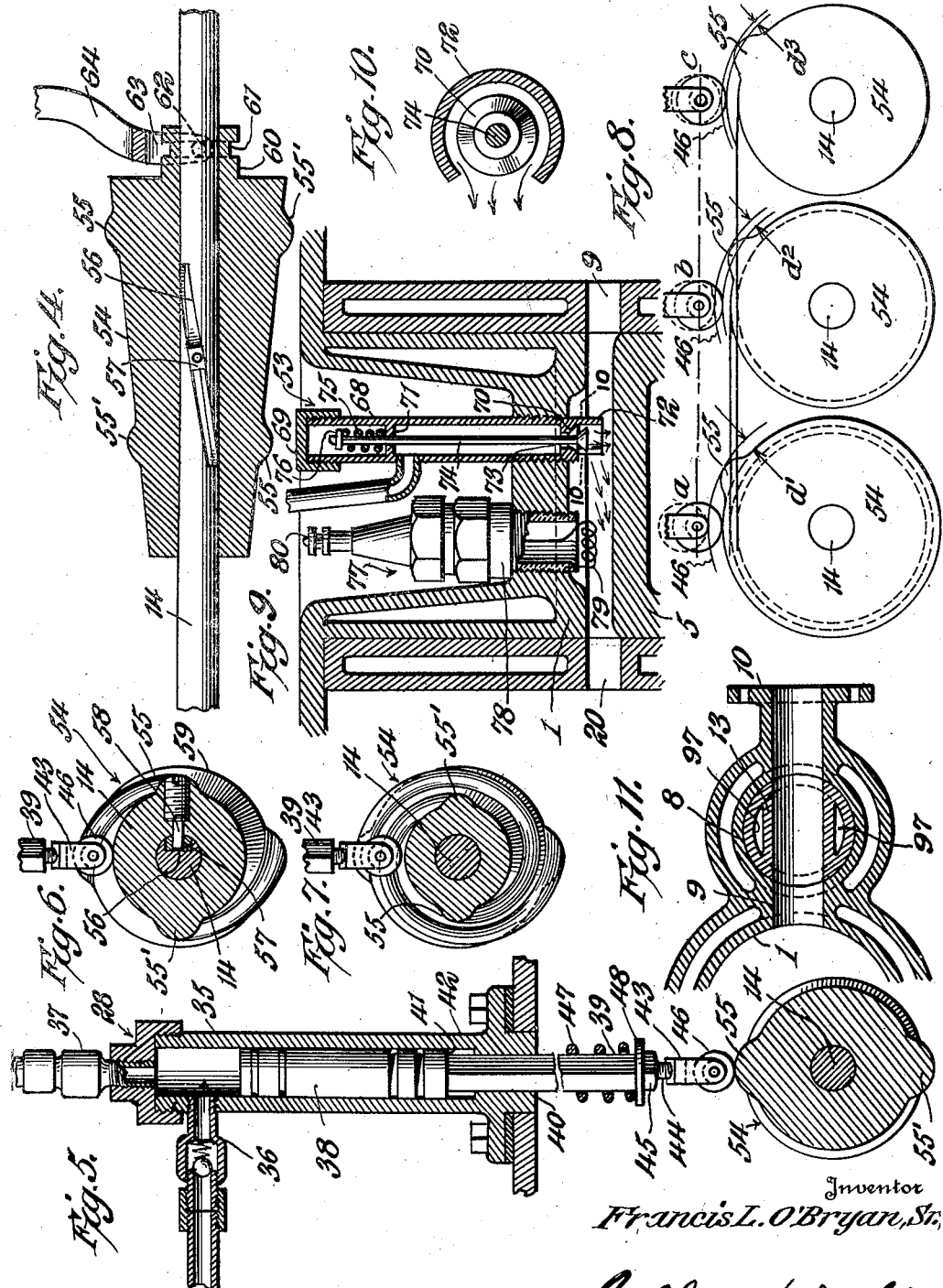

2,059,804

UNITED STATES PATENT OFFICE 2,059,804

INTERNAL COMBUSTION ENGINE

Francis L. O'Bryan, Sr., Framingham Center, Mass.; Marion O'Bryan administratrix of said Francis L. O'Bryan, deceased Application March 20, 1933, Serial No. 661,816

5 Claims. (Cl. 123—139)

This invention relates to internal combustion engines.

An object of the invention is to provide, in an internal combustion engine of the solid injection type, an improved cam mechanism for operating an injection pump and being controllable for varying simultaneously the timing of the injection and the size of the injection charges.

Another object is to provide an improved arrangement of injection valve or similar device and auxiliary ignition means.

Another object is to provide control means for controlling simultaneously the action of two or more of three devices, i. e., an auxiliary ignition device, an intake throttle valve, and an injection pump.

In the accompanying drawings:

Figure 1 is a view in side elevation of an engine embodying the invention, parts being broken away to show injection pumps and an operating cam;

Figure 2 is a sectional view taken on the line 2—2 of Figure 1;

Figure 3 is a detail view on an enlarged scale showing a plurality of injection pumps in longitudinal vertical section and an operating cam therefore in side elevation;

Figure 4 is a central vertical longitudinal sectional view of a pump-operating cam also drawn on an enlarged scale;

Figure 5 is a sectional view taken on the line 5—5 of Figure 3;

Figure 6 is a sectional view taken on the line 6—6 of Figure 3;

Figure 7 is a sectional view taken on the line 7—7 of Figure 3;

Figures 8a, 8b, and 8c are diagrammatic views of a cam and cam follower "stopped" at different positions relative to the cam.

Figure 9 is a vertical sectional view through a cylinder head drawn on an enlarged scale showing an injection valve and auxiliary ignition device;

Figure 10 is a sectional view taken on the line 10—10 of Figure 9 and drawn on an enlarged scale; and Figure 11 is a sectional view taken on the line 11—11 of Figure 2 and drawn on an enlarged scale.

The accompanying drawings illustrate an engine embodying the invention in a representative form, the engine shown by way of example including a crank case A, a plurality of engine cylinders 1, 2, 3, and 4 mounted on the crank case, a plurality of pistons 5 mounted for reciprocation in the engine cylinders, a crank shaft 6, and connecting rods 7 for connecting the pistons 5 to the crank shaft in the usual manner. Mounted alongside of each engine cylinder is an intake valve cylinder 8 formed with a port 9 leading to the engine cylinder and with a port 10 leading to an intake manifold 11, the entrance of air through which is controlled by a throttle valve 12. An intake piston valve 13 formed with a passage 13a adapted to register with the ports 9 and 10 is mounted in each valve cylinder 8 and is connected to a valve-operating shaft 14 by means of a connecting rod 15. The crank shaft 6 and the valve-operating shaft 14 extend beyond the end of the crank case and are provided respectively with sprockets 16 and 17 connected in driving relation by means of a chain 18, the relative diameters of the sprockets being such that the valve-operating shaft is driven at one fourth the speed of the crank shaft. Mounted on the side of each cylinder opposite that on which the intake valve cylinder is disposed is an exhaust valve cylinder 19 formed with a port 20 leading to the engine cylinder and with a port 21 leading to an exhaust manifold 22. An exhaust piston valve 23 provided with a passage 23a adapted to register with the ports 20 and 21 is mounted for reciprocation in each exhaust valve cylinder and is connected to a valve-operating shaft 24 by means of a connecting rod 25, the shafts 6 and 24 extending beyond the end of the crank case and being provided respectively with sprockets 26 and 26a connected in driving relation by means of a chain 27. The relative diameters of the sprockets 26 and 26a are such that the latter is driven at one fourth the speed of the former.

The engine shown by way of example operates on a four-stroke cycle; i. e., there is one explosion per cylinder for each two revolutions of the crank shaft. Since the valve-operating shaft 14 makes one revolution for every four revolutions of the crank shaft, the valve 13 will travel from its extreme upper to its extreme lower position once during two complete revolutions of the crank case, and, vice versa, will travel from its extreme lower to its extreme upper position once during two complete revolutions of the crank shaft. Accordingly, the passage 13a in the valve 13 will register with the ports 9 and 10 once during each two revolutions of the crank shaft, i. e., once during each cycle. Similarly, since the valve-operating shaft 24 revolves at one fourth the speed of the crank shaft, the passage 23a in the valve 23 will register with the ports 20 and 21 once during each complete operating cycle. It will be understood that during each movement of the valves from their upper to lower positions or vice versa the valve 13 will move into and then out of registry with the associated port, and since the registration is effected during movements of the valves in both directions it is necessary that the operating shafts 14 and 24 be operated at one fourth the speed of the crank shaft as distinguished from the usual arrangement wherein the valve-operating or cam shaft is operated at half the speed of the crank shaft.

Pumps 28, 29, 30, and 31 are provided for forcing fuel under pressure into the cylinders of the engine, these pumps as shown being cast en bloc and the pump casting being provided near its lower end with a flange 32 which is secured to a web 33 of the engine crank case, the latter being provided with an opening 34 through which the extreme lower part of the pump casting extends. Each pump includes a cylinder 35 provided with an inlet valve 36 and a discharge valve 37, and a piston 38 having a snug fit within the cylinder. Each piston is provided with a square operating rod 39 which extends downwardly through a square opening 40 in the bottom of the cylinder. At the juncture of the operating rod with the piston 38 there is a shoulder 41 adapted to cooperate with a shoulder 42 at the lower end of the cylinder bore for limiting downward movement of the piston and operating rod. A clevis 43 provided with a threaded stem 44 is connected at the lower end of each operating rod and is held in adjusted position relative thereto by means of a lock nut 45. Each clevis serves to mount a cam follower roller 46. A spring 47 interposed between the bottom of the pump casting and a disc 48 secured to the lower end of the operating rod 39 by means of the nut 45 urges the pump piston toward its lower position. Pipes 49, 50, 51, and 52 lead from the pumps 28, 29, 30, and 31 to injection valves 53 in the cylinders 1, 4, 3, and 2, respectively.

A conically shaped cam 54 is mounted for sliding movements on the shaft 14 but is constrained to rotate therewith for cooperation with the rollers 46 of the injection pump operating rods 39 for reciprocating the pump pistons. The pumps are grouped closely enough to permit their operating rods all being actuated by the single cam 54. Because of the fact that the shaft 14 rotates at one fourth the speed of the crank shaft 6, it is necessary that the cam be provided with two lobes 55 and 55′, these lobes being arranged in such a way that at any given cross section of the cam one lobe is diametrically opposite the other. This arrangement provides for two operations of each pump plunger for each single revolution of the shaft 14.

In order that the single cam 54 will operate the plungers of the four pumps in properly timed relation, the lobes 55 and 55′ are of a helical configuration, the pitch of the generating helixes being such that if the parts are in the position shown in Figure 3, wherein the plunger of pump 28 is held up by the lobe 55, the lobe will engage the roller of the pump 31 after the cam has moved through one quarter revolution, and will engage the roller of pump 30 after the cam is moved through a further quarter revolution, and so on. Since the peripheral speed of the cam is greater at its larger or right hand end than at its smaller end, so that the lobe passes under the follower roller relatively rapidly, I prefer to make the lobes of greater circumferential extent at the larger end than at the smaller end, so as to provide for an approximately constant pump plunger operating speed.

In order to vary the size of the fuel charges delivered by the pumps, the cam 54 is moved to the right on the shaft 14, whereby the portions of the lobes closest to the body of the cam are ineffective for raising the pump plungers. In order that the timing of the injection of fuel be varied in accordance with different loads, I provide the shaft 14 with a spirally directed groove 56 and provide a slide block 57 mounted in the groove and having pivotal connection with a pin 58 the outer threaded part 59 of which is screwed into the cam body, the arrangement being such that when the cam is moved longitudinally of the shaft the block 57 following the groove 56 will effect an angular displacement of the cam about the shaft 14, thereby causing the lobes to engage the rollers 46 sooner or later during the rotation of the cam, depending upon the direction in which the cam is shifted.

Various means may be employed for shifting the cam, but in the form shown I provide the cam with an extension 60 formed with a peripheral groove 61 which receives radially disposed pins 62 secured to a fork 63 on the lower end of a lever 64 pivoted to the crank case as at 65. When the cam is in the position shown in Figures 1 and 3, the rollers 46, when in their lowermost positions, will contact with or be just barely above the body of the cam, so that the full extent of the cam lobes will be effective for raising the plungers, and for thereby effecting pumping of the maximum fuel charge. If the load decreases, the lever 64 will be rocked in a counter clockwise direction, thereby shifting the cam to the right. Then the rollers 46, when in their lowermost positions, will be disposed somewhat above the cam body, so that only the upper portions of the lobes 55—55′ will be effective for raising the plungers 38, and the size of the fuel charges pumped will be less. Movement of the cam to the right for effecting this decrease in the fuel charge will also shift the cam angularly about the shaft 14 in the direction of the arrow X on Figure 3, thereby delaying the engagement of the lobes with the rollers and effecting a retarded fuel injection. Thus, by shifting the cam by means of the lever 64, the size of the fuel charge is decreased simultaneously with the retarding of the timing of injection. Figures 8a, 8b, and 8c show diagrammatically the variation in the amount of pump plunger stroke and hence in the size of fuel charges which is effected by shifting the cam to different positions. In Figure 8a the cam 54 is shown in the position it occupies in Figures 1 and 3, wherein the roller 46, when in its lowermost position, is substantially in contact with the cam body, so that the entire height $d^1$ of the lobe is effective for raising the roller. In Figure 8b the roller 46, when in its lowermost position, is disposed somewhat above the body of the cam so that the portion of the lobe corresponding to the height $d^2$ only is effective for lifting the roller, and in Figure 8c the extreme upper portion of the lobe corresponding to the height $d^3$ only is effective for lifting the roller.

When the engine is operated at low loads, it is desirable that the quantity of air admitted to the cylinders be reduced, and in order that this may be accomplished simultaneously with the movement of the cam I prefer to connect the throttle valve 12 to the lever 64 by means of a link 6, the arrangement being such that movement of the cam to the right will be accompanied by movement of the throttle valve 12 toward its closed position. A master operating member 67 is connected to the lever 64 as at 67ᵃ and may be operated under either manual or governor control.

Each of the injection valves 53 includes a casing 68 provided with a cap 69 and formed at its lower end with a valve seat 70 and adjacent its upper end with a wall 71. Below the valve seat 70 the casing is provided with a downwardly extending substantially semicircular skirt 72. A valve 73 is adapted to cooperate with the seat 70 for controlling the admission of fuel to the engine cylinder, and is provided with a stem 74 which extends upwardly through the wall 71. A spring 75 surrounding the upper end of the stem and being interposed between the wall 71 and a disc 76 on the upper end of the stem serves to urge the latter upwardly and the valve to closed position. In operation, when fuel is forced into the casing of the injection valve, it will exert pressure upon the valve 73, thereby moving the latter downwardly to open position against the urge of the spring 75, and fuel passing below the valve seat will in part be deflected toward the left as viewed in Figure 9 by means of the skirt 72. When the engine is operating at low loads, or when it is idling, the air intake having been throttled, the temperature of compression will, in some cases, be reduced below the temperature of self-ignition, and in such case it is necessary to provide means for augmenting the temperature of the compressed air so as to effect ignition of the fuel. For accomplishing this purpose I provide each cylinder with an auxiliary ignition device 77 which is mounted alongside of the injection valve so as to be disposed in the path of the fuel deflected laterally by the skirt 72. The auxiliary ignition device shown by way of example includes a threaded body 78 which extends down into the top of the cylinder and serves to mount an electric heating element 79, one end of which is grounded and the other end of which leads to a terminal 80, which in turn is connected by means of a conductor 81 to a spring blade contact 82 which rests upon an insulating block 83 on the operating member 67 when the engine is operating under normal load conditions. When the member 67 is moved to the left as viewed in Figure 1 to cut down the pump discharge and retard the timing of fuel injection, a block of conducting material 84 carried by the insulating block 83 will move into contact with the spring blade 82, thereby completing the circuit through the heating element 79, the conductor 81, the spring blade 82, the conducting block 84, a conductor 85, and a battery 86 grounded as at 87. The heat generated in the heating element 79 will augment the temperature of compression sufficiently to produce a local temperature high enough to effect combustion of the fuel which has been directed onto the heating element by the skirt 72 of the injection valve.

I also may provide improved means for lubricating the piston exhaust valves 23. It is well known that, despite the many advantages and desirable characteristics of piston valves as distinguished from poppet valves usually employed in internal combustion engines, it has been so difficult to lubricate piston exhaust valves efficiently that little real progress has heretofore been made with engines embodying valves of this type. In order to lubricate the valves I maintain the upper end of the exhaust valve cylinder 19 constantly filled with oil vapor, from which particles of oil are deposited upon the inside walls of the valve cylinder and effective lubrication is obtained. The lower end of the valve cylinder opens directly into the crank case and is lubricated by oil splashed and by oil vapor caused by operation of the crank shaft 6, the valve-operating shafts, and associated connecting rods.

I provide a blower 88 which communicates with the crank case above the level of the oil therein by means of an intake pipe 89 and which communicates with the upper end of the valve cylinder 19 by means of a discharge pipe 90. A return pipe 91 leads from the extreme upper end of the valve cylinder to the crank case. The blower is driven by means of a belt 92 which passes around a pulley 93 on a shaft 94 driven by a chain 95 from the sprocket 96 on the valve-operating shaft 24. In operation, the blower draws oil vapor through the pipe 89 and forces it through the pipe 90 into the upper end of the exhaust valve cylinder, whereby the walls of the latter are constantly maintained covered with oil. The return pipe 91 provides for the circulation of oil vapor through the valve cylinder and prevents the building up of pressure in the latter so that reciprocation of the valve is not interfered with by a dash pot effect. Circulation of oil vapor through the upper end of the valve cylinder also serves to cool the latter.

The intake valve cylinders 8 may if desired be lubricated in the same manner as the exhaust valve cylinders, but since the intake valve cylinders do not get as hot as the exhaust valve cylinders it usually is not so difficult to lubricate them effectively, and in most cases it will be sufficient to provide openings 97 through the intake valves 13, which will permit the passage of some oil vapor upwardly from the crank case to the upper ends of the intake valve cylinders.

Although the engine disclosed herein by way of example is believed to embody the invention in a practical and the at present preferred form, it will be understood that various modifications can be made in the construction and relative arrangement of the parts without departing from the invention as defined in the claims.

I claim:

1. In an internal combustion engine of the solid injection type, the combination of an engine driven shaft element; a conically shaped cam element mounted for sliding and rotative movements on said shaft element; a slot in one of said elements directed spirally with respect to the axis thereof; means on the other said element extending into said slot; means for shifting said cam element longitudinally of said shaft element; and an injection pump having a reciprocable plunger cooperatively connected to said cam element.

2. In an internal combustion engine of the solid injection type, the combination of an engine driven shaft element; a conically shaped cam element mounted for sliding and rotative movements on said shaft element; a slot in one of said elements directed spirally with respect to the axis thereof; means on the other said element extending into said slot; means for shifting said cam element longitudinally of said shaft element; an injection pump having a reciprocable plunger mounted for cooperative connection with said cam; and a stop for limiting movement of said plunger toward said cam.

3. In a multicylinder internal combustion engine of the solid injection type, the combination of an engine driven shaft element; a conically shaped cam element mounted for sliding and rotative movements on said shaft element; a lobe on said cam element extending spirally with respect to the axis thereof; a slot in one of said elements directed spirally with respect to the axis thereof; means on the other said element extending into said slot; means for shifting said cam element longitudinally of said shaft element; a plurality of injection pumps for the respective engine cylinders each having a reciprocable plunger; and connections between said plungers and said cam at points spaced longitudinally of the latter.

4. In a multicylinder internal combustion engine of the solid injection type, the combination of an engine driven shaft element; a conically shaped cam element mounted for sliding and rotative movements on said shaft element; a lobe on said cam element extending spirally with respect to the axis thereof; a slot in one of said elements directed spirally with respect to the axis thereof; means on the other said element extending into said slot; means for shifting said cam element longitudinally of said shaft element; a plurality of injection pumps for the respective engine cylinders each having a reciprocable plunger; connections between said plungers and said cam at points spaced longitudinally of the latter; and stop means for limiting movement of said pump plunger connections toward said cam.

5. In a multicylinder internal combustion engine of the solid injection type, the combination of an engine driven shaft element; a conically shaped cam element mounted for sliding and rotative movements on said shaft element; a lobe on said cam element extending spirally with respect to the axis thereof, said lobe gradually decreasing in circumferential extent in a plane perpendicular to the axis of the cam from the larger end of the cam to the smaller end thereof; a slot in one of said elements directed spirally with respect to the axis thereof; means on the other said element extending into said slot; means for shifting said cam element longitudinally of said shaft element; a plurality of injection pumps for the respective engine cylinders each having a reciprocable plunger; and connections between said plungers and said cam at points spaced longitudinally of the latter.

FRANCIS L. O'BRYAN, Sr.